United States Patent [19]

van der Hoeven

[11] Patent Number: 4,801,495

[45] Date of Patent: Jan. 31, 1989

[54] DECORATIVE PANEL WITH IMPROVED SURFACE CHARACTERISTICS

[75] Inventor: Johannes C. W. van der Hoevan, Horn, Netherlands

[73] Assignee: Hoechst Aktiengesellschaft, Fed. Rep. of Germany

[21] Appl. No.: 47,320

[22] Filed: May 8, 1987

Related U.S. Application Data

[63] Continuation of Ser. No. 734,148, May 15, 1985, abandoned.

[30] Foreign Application Priority Data

May 17, 1984 [DE] Fed. Rep. of Germany ....... 3418282

[51] Int. Cl.[4] ............................................. B32B 27/00
[52] U.S. Cl. .................................... 428/286; 428/195;
428/211; 428/423.1; 428/424.2; 428/425.1;
428/503; 428/514; 428/542.2; 428/913.3;
427/44; 156/272; 156/273.3; 156/307.4;
156/275.5
[58] Field of Search ............... 428/195, 211, 203, 204,
428/913.3, 514, 503, 423.1, 542.2, 424.2, 286,
425.1; 427/44; 156/272, 307.4, 273.3

[56] References Cited

U.S. PATENT DOCUMENTS

| 3,218,225 | 11/1065 | Petropoulas | 428/503 |
| 3,589,974 | 6/1971 | Albrinck et al. | 428/503 |
| 3,841,956 | 10/1974 | Palazzolo et al. | 428/503 |
| 4,246,315 | 1/1981 | Kopp et al. | 428/315 |
| 4,501,635 | 2/1985 | Siry et al. | 427/44 |

Primary Examiner—Sharon A. Gibson
Attorney, Agent, or Firm—Foley & Lardner, Schwartz, Jeffery, Schwaab, Mack, Blumenthal & Evans

[57] ABSTRACT

The decorative panel having an underlay or core layer and a decorative layer on one or both sides of the core. At least one of the two surfaces of at least the outermost layer of the panel comprises a synthetic resin of one or more radiation-polymerized components selected from unsaturated acrylates and methacrylates. This layer, when scratched, has a scratch resistance of at least 1.5 N and preferably 2 to 7 N (DIN 53 799, part 10). In the method for manufacturing the decorative panel, a liquid surface layer which includes the radiation-polymerizable components is applied onto an underlay and then polymerized by means of radiation. In a further step, the radiation-polymerized surface layer is pressed together with the underlay at an elevated temperature.

14 Claims, No Drawings

DECORATIVE PANEL WITH IMPROVED SURFACE CHARACTERISTICS

This is a continuation of application Ser. No. 734,148, filed May 15, 1985, now abandoned.

BACKGROUND OF THE INVENTION

The invention relates to a decorative panel comprising a core layer and a decorative layer on one or both sides, as well as to a method for its manufacture. Panels of this type are used in the building industry for interior or exterior walls, either as facing panels or as self-supporting elements, depending on their thickness.

The panels used heretofore are, for instance, decorative pressed laminate panels (defined by DIN 16 926), known as "high pressure laminates" (H.P.L. panels). They comprise a core layer consisting of a thermopressed stack of resinated paper webs and a covering layer of resinated decorative paper. These panels have the disadvantage of being attacked by mineral acids, especially at concentrations over 10% and a reaction time longer than 10 minutes. Furthermore, in their standard version, these panels are not sufficiently weather-resistant, because the type of resin used in the covering layer is vulnerable to hydrolysis. Panels of this kind can therefore be used only to a limited extent as work surfaces in chemical laboratories or for the production of wet cells, which must be cleaned with acids. If they are used outdoors, additional, expensive provisions must be made in order to improve their resistance to the effects of weather.

On the other hand, plastic-based laminates and panels, such as polyester or acrylate panels, are particularly vulnerable to scratching and are not sufficiently resistant to organic solvents. For this reason, they, too, are less well suited to these applications.

SUMMARY OF THE INVENTION

It is accordingly an object of the present invention to provide a method and composition for a decorative panel suitable in particular for exterior walls, for interior decoration, and for the manufacture of specialized furniture.

Another object of the invention is to provide a decorative panel, the surface of which is not vulnerable to hydrolysis and is sufficiently resistant to the effects of weathering and to mineral acids and organic solvents.

Yet another object of the invention is to provide a decorative panel, as above, which is highly scratch-resistant.

These objects and others are achieved by a decorative panel comprising an underlay, and at least one additional layer applied to the underlay, the additional layer comprising a synthetic resin of one or more radiation-polymerized components selected from the group consisting of unsaturated acrylates and methacrylates, and wherein the additional layer has a scratch resistance of at least 1.5 Newtons.

The objects of the invention are also achieved by a method for producing a decorative panel, comprising the steps of applying at least one liquid layer to the surface of an underlay, polymerizing the liquid layer by means of radiation, and pressing the radiation-polymerized surface layer together with the underlay at an elevated temperature.

DETAILED DESCRIPTION OF THE PREFERRED EMBODIMENTS

The panel of the invention is a body of large surface area in proportion to its thickness, the form and structure of the surface being adapted to the intended use; for instance, it may also have an arched shape. A panel as defined by the invention will be understood to include plastic films, in particular of PVC and polystyrene, which may be colored and/or printed as necessary.

It has been found unexpectedly that when at least one of the outer surfaces of this decorative panel utilizes the specialized synthetic resin layer polymerized by radiation, the panel surface not only has excellent weather resistance compared to previously known panels, but unexpectedly has a high scratch resistance as well. It is furthermore substantially less vulnerable to acids and organic solvents.

The core layer performs the load-bearing function of the panel. It is made, for example, of wood. Other suitable materials for the core layer are plastic panels based, for instance, on polyvinyl chloride or polyethylene; plastic films; or metal plates, for instance of steel, aluminum, copper, brass, or other alloys. The radiation-polymerized synthetic resin layer is located on the immediate surface of these core layers or is bonded to the core layer by means of glue films or glue joints, but preferably with adhesion-promoting synthetic resins such as phenol-formaldehyde precondensate or resorcinol-formaldehyde precondensate. Glue joints are simply layers of adhesive, while glue films are supporting layers coated or impregnated with adhesive. Adhesion promoters are substances which, while not being adhesive themselves, promote a bond between two different kinds of material.

The core layer may furthermore comprise the usual sheets of thermopressed paper, in particular soda craft paper, impregnated with thermosetting synthetic resin, in particular phenol-formaldehyde resin, conventionally used in HPL panels. Depending on the desired panel thickness, from 1 to approximately 100 sheets, one on top of the other, are thermopressed together.

The core layer may also comprise pressure-stiffened bonded fabric or densified mats of mineral fibers, glass fibers, plastic fibers, or a mixture of fibers, but preferably cellulose. Examples of cellulose-containing fiber layers are those made of randomly deposited wood fibers or wood chips. The bonded fabric or mat of wood and/or cellulose fibers is manufactured by applying a synthetic resin to the fibers, drying the resinated fibers, shaping a fiber mat, and precompacting this mat by pressure.

There may optionally be an underlay, containing a thermosetting amino plastic or phenolic resin, on the outer surface or surfaces of this fiber-containing core layer. The underlay may, for instance, comprise a pigmented or unpigmented bonded fabric or paper.

In a preferred embodiment, a decorative radiation-polymerized synthetic resin, that is, one which by means of added pigments or dyes has a particular visual or decorative effect, is applied directly onto the fiber-containing core layer or onto the underlay. A clear layer, that is, a transparent and pigment-free layer, of radiation-polymerized synthetic resin can be applied to the decorative radiation-polymerized synthetic resin layer, the clear layer forming the outermost layer or layers of the panel.

However, it is entirely possible to dispense with this clear synthetic resin layer so that the decorative synthetic resin layer or layers then form the outermost layer or layers.

Instead of the decorative synthetic resin layer, a decorative layer based on a colored and/or printed plastic film or based on paper can be used. This generally comprises a pigmented, colored, and/or printed paper.

The radiation-polymerized synthetic resin layer, in this case transparent, is then located on the plastic film or decorative paper. For this application, the decorative paper contains conventional thermosetting synthetic resin, in particular amino plastic resin, and is located on core layers made up of the soda craft paper typical of HPL panels, or of randomly deposited wood or cellulose fibers resinated with phenol.

The compounds provided for fabricating the uppermost, radiation-polymerized synthetic resin layer include acrylates or methacrylates which are capable of being radically polymerized by actinic radiation and which are present either individually or together in a polymerizable mixture. The preferred component is a polyfunctional prepolymer, that is, one which is multiply unsaturated. Also present in the copolymerizable mixture, besides this predominant component, may be a further component having a diluting effect, known as a diluting monomer or a diluting oligomer. In the mixture, the polyfunctionl prepolymer is present in a proportion of from 50 to 100% by weight, and in particular from 60 to 90% by weight, based on the total weight of the copolymerizable components. Prepolymers of low viscosity (less than 100 poise at 20° C.) are used without the diluting monomers or oligomers.

The components used have a pronounced tendency to polymerize radically under the influence of actinic radiation. Possible sources of actinic radiation are near ultraviolet light or high-energy radiation such as electron beams, particle beams, or X-rays. The radically polymerizable prepolymer is a polyfunctional unsaturated aliphatic or aromatic acrylate or methacrylate, preferably an unsaturated polyester acrylate oligomer, but in particular an aliphatic urethane acrylate oligomer. Aromatic urethane acrylate oligomers do produce scratch-resistant surfaces as well, but they yellow after a period of time when they are used outdoors.

Examples of additional suitable monomers or oligomers that may be used in the radically copolymerizable mixture include, besides the prepolymer, a mono-, di-, tri-, tetra-, penta-, or hexacrylate or methacrylate, but preferably a di- or triacrylate. These acrylates or methacrylates in the mono- to hex-form are esters of mono or polyfunctional alcohols, i.e., polyols with 1 to 6 OH-groups with acrylic acid or methacrylic acid and are therefore also known as polyolacrylates or polyolmethacrylates. Suitable diacrylates are esters of acrylic acid with aliphatic divalent alcohols, especially ethylene glycol, 1,2-propylene glycol, 1,3-propylene glycol, butanediols, 1,6-hexanediol or neopentyl glycol; with aliphatic ether alcohols, in particular diethylene glycol, dipropylene glycol, dibutylene glycol, polyethylene glycols or polypropylene glycols; with oxyalkylated compounds of the above-named aliphatic alcohols and ether alcohols; or also with aromatic dihydroxyl compounds, in particular bisphenol A, pyrocatechol, resorcinol, hydroquinone, p-xylylene glycol or p-hydroxybenzyl alcohol. Preferred diacrylates are 1,6-hexanediol diacrylate, tripropylene glycol diacrylate and 1,4-butanediol diacrylate. Preferred triacrylates are trimethylol propane triacrylate and pentaerythritol triacrylate.

Epoxy acrylate and silicone acrylate oligomers, which, in addition to the urethane acrylate and unsaturated polyester acrylate oligomers mentioned above, are suitable polyfunctional prepolymers, are preferably used in the radically copolymerizable mixture along with the diacrylates or triacrylates already mentioned.

The prepolymers are compounds known per se and are produced, for example, from hydroxylated copolymers in which the hydroxyl groups are statistically distributed along the copolymer chain. Statistically unsaturated acrylic copolymers are obtained from this copolymer by esterification of the hydroxyl groups with acrylic acid. To produce intermediate unsaturated acrylic copolymers, the hydroxyl group is attached to the end of the chain when the hydroxylated copolymers are produced. Urethane acrylate oligomers are produced by the reaction of acrylates or methacrylates containing hydroxy groups, such as hydroxyethyl methacrylate, with multivalent isocyanates, preferably diisocyanates. The di- or polyisocyanates can preferably be reaction products of diols, polyether diols, or polyester diols havoing a stoichiometric excess of monomeric di- or polyisocyanate.

If the polyfunctional prepolymer predominates in the polymerizable mixture, then, as the fundamental resin, its chemical nature determines the characteristics of the cured surface layer. As the diluting monomer or oligomer, the added acrylate or methacrylate in mono- to hex-form makes it possible to adjust the viscosity of the mixture to be cured, which is normally within the range from 20 to 100 poise (at 20° C.), and participates fully in the radical polymerization. In the process of irradiation, the hardening of the coating is the result of the radical polymerization at the double bonds of the prepolymer and, if present, of the diluting monomers or oligomers. When actinic radiation is used for curing, photoinitiators which absorb ultraviolet light and which, by forming radicals, facilitate the initiation of radical polymerization, must be added. On the other hand, when electron beams are used for curing, photoinitiators are not needed. Most photoinitiators include at least one carbonyl group, which is in conjunction with an aromatic ring. A photoinitiator system comprising several components is usually used.

The synthetic resin polymerized by radiation additionally contains the usual additives, such as plasticizers, fillers, pigments, and stabilizers, for attaining the desired decorative, mechanical, and physical surface characteristics. Examples of these substances include barium sulfate, silica, aluminum oxide, and pigments that are colorfast when exposed to light.

To produce the decorative laminate panel, the liquid, radiation-polymerizable compounds are applied to the underlay that is to be coated by, for example, spraying or pouring, or by using a scraper system or roller, or by screen printing. The applied layer is transparent when it is applied to a decorative layer. Alternatively, it may itself be decorative; in that case it is dyed and/or pigmented and is located on a non-decorative paper layer or directly on the core layer. In a further embodiment, an additional radiation-polymerizable layer, which, however, is transparent instead of decorative, is applied to this decorative, radiation-hardened synthetic resin layer.

The underlay used for applying the radiation-polymerizable compounds is thus a paper layer, a decorative paper layer, or the above-mentioned core layers of wood, plastic, metal, or a stack of further fiber-containing layers, which form the core of the laminate panel that is later obtained. The fiber-containing layers of the stack, which preferably comprise soda craft papers or a bonded fabric made of wood and/or cellulose fibers, contain the preset thermosetting resins typical in HLP panels, in particular phenol-formaldehyde resins, while the papers which may also be present in the stack contain an amino plastic resin, but in particular a phenolic resin. The proportion of thermosetting resins amounts to 20 to 250% by weight, based on the weight of an individual layer.

The saturation or impregnation of the fiber-containing layers or paper layers is effected by, for example, immersion in a bath having a solution or dispersion containing the thermosetting resin, or by applying or spraying by means of a dispensing system. The solvent or dispersing agent is of the aqueous alcohol, aqueous acetone, or aqueous type, depending on the synthetic resin used. It may also contain up to 20% by weight of a flame retardant. The desired quantity of resin is then distributed by scraping or squeegeeing it off, for instance using rollers.

Even before the radiation-polymerizable compounds are applied to the underlay provided, the thermosetting resins of the underlay are pre-cured and dried in the conventional manner.

To initiate the polymerization effected by radiation, a conventional source for forming free radicals, such as a photoinitiator, can be used, or else heat is merely applied. If the photopolymerizable layer contains photoinitiators, the polymerization is initiated during a pass beneath mercury vapor lamps. For curing by means of ultraviolet radiation, the absence of oxygen is not necessary. Electron beams suitable for use in curing the polymerizable compounds have an energy of 150 to 350 keV. The energy of the electron accelerators is determined by the thickness of the synthetic resin layer to be formed, the required radiation dose, and the duration of the reaction or throughput speed.

The devices used for accelerating the electronic beams are available on the market. These accelerators are known as the scanner type and the linear cathode type. Free radicals are formed as a result of interaction with the components of the polymerizable layer. This curing process is usually performed at room temperature. Curing by means of electron beams is preferably performed in an inert, that is, largely oxygen-free, atmosphere.

After the radiation-effected polymerization, the underlays, if they are sufficiently supple, are wound into rolls for storage or else are cut immediately to the desired shape. If the underlay having the radiation-polymerized resin comprises only a paper layer, then it is placed on a stack of fiber-containing layers comprising the core layer. It is also possible to provide the underside of the stack with such an underlay as well.

As in the conventional manufacture of HPL panels, the packet, comprising the fiber-containing core layer and the radiation-polymerized surface layer or layers, and the layers of paper or decorative paper possibly located between them as well, is thermopressed to make a decorative panel; the thermosetting resins are cured in this process. The temperature is preferably in the range from 120° to 210° C., the pressure is in the range from 10 to 100 bar, and the reaction time is from 1 to 30 minutes. However, if the core layer comprises a wood, plastic, or metal panel, then the temperature and pressure can usually be reduced as far as 80° C. and 5 bar, respectively.

The pressing is effected in a known stationary, once-through, or continuous press apparatus. The number and thickness of the fiber-containing layers in the core layer, or the thickness of the core layer, is selected depending on the intended use of the panel; for exterior applications, depending on the particular use, panel thicknesses from 3 to 10 mm are required. If a large number of panels having radiation-polymerized synthetic resin layers are stacked on top of one another in the press, which is economically advantageous when the core layer is thin, then each of the individual panels is separated from the others by its own separating means, such as a layer of paper, plastic film, or a metal plate, which is capable of imparting some structure to the adjacent outer layer of the particular panel.

The decorative panels manufactured are unexpectedly highly weather-resistant and scratch-resistant, which may be due to an unforeseeable interaction between the various resins, or perhaps to a subsequent crosslinking of the radically polymerizable compounds during the thermopressing operation. The scratch resistance and chemical resistance are, unexpectedly, substantially greater than if a panel had been given a coating of the same radiation-polymerizable compounds and the coating had merely been radically polymerized by radiation, without the thermopressing process.

The invention will be explained in detail by means of the following examples. The percentages given are by weight.

In measuring scratch resistance in accordance with DIN 53799, part 10, the force with which a diamond needle produces a visible scratch on the surface of the panel is ascertained. This measurement is made immediately after the diamond needle has acted on the panel, because the elasticity of the surface layer means that surface deformation can decrease gradually after being scratched.

EXAMPLE 1

A pigmented (pigment proportion, 15%) or printed decorative paper was impregnated on one side with thermosetting melamine resin (resin application, 80%) and the resin was partially cured. Using rollers, a transparent liquid (viscosity, 60 poise at 20° C.) comprising a radiation-polymerizable 6:4 mixture of aliphatic urethane acrylate oligomer as the prepolymer, and trimethylol propane triacrylate as the diluting monomer, was applied to the opposite side of the decorative paper, whereupon a closed film (layer thickness, approximately 50 $\mu$m) formed. Subsequently, the film of radiation-polymerizable compounds was largely homogeneously crosslinked with electron beams in an inert atmosphere (oxygen content less than 100 ppm), without the application of pressure and at room temperature. The absorbed radiation dose was 60 kGy. One decorative paper at a time was placed, with the polymerized synthetic resin layer on the outside, upon both surfaces of a stack of 12 papers lying one on top of the other. These papers were previously saturated with thermosetting phenol-formaldehyde resin, and the resin was partially cured. The packet was pressed in a conventional press for HPL panel manufacturing, between two forming elements, for 10 minutes at 150° C. and 80 bar. The resultant packet had the following makeup:

a transparent layer (radiation-polymerized synthetic resin);

a pigmented or printed decorative paper (with melamine resin) as a decorative layer;

12 paper webs (with phenol-formaldehyde resin) as the core layer;

pigmented or printed decorative paper (with melamine resin) as a decorative layer; and a transparent layer (radiation-polymerized synthetic resin).

The panel taken from the press after cooling, which was decorative on both sides, was 3 mm thick, had a matte surface with a texture similar to orange peel given it by the forming elements in the press and, depending on the decorative paper used, had a scratch resistance of from 3 to 4N (DIN 53799, part 10). The scratch resistance was measured immediately after the scratching was done. The surface of the panel exhibits no change after 6 hours of exposure to several drops of concentrated mineral acid, such as sulfuric acid, and rinsing of the acid with water (DIN 53230). The color-fastness of the panel upon exposure to light was assigned the grade of 8 (DIN 54 004). The resistance of the panel to the effects of weather was measured in accordance with ASTM G 53-84, in which a time cycle of 4 h UV/4 h CON (condensation period) was maintained for 1500 h at a test temperature of 50° C. After weathering, the panel exhibited no efflorescence of the fillers, no loss in sheen, and no discoloration.

EXAMPLE 2

The radiation-polymerizable liquid was a homogeneous, paste-like mass (viscosity, 60 poise at 20° C.). As polymerizable components, it contained the following:

62 parts by weight of aliphatic urethane acrylate oligomer as the prepolymer, and 27 parts by weight of trimethylol propane triacrylate as the diluting monomer.

Additionally, the liquid contained:

10 parts by weight of white pigment ($TiO_2$), and 1 part by weight of silica (Aerosil ®200).

The various components of this mixture were processed, for instance using a ball mill, into a homogeneous, paste-like mass and in this form were painted onto soda craft paper in a layer approximately 80 $\mu$m thick.

The soda craft paper had previously been impregnated with thermosetting phenol-formaldehyde resin (resin application, 70%) and this resin was then partially cured.

The radiation-polymerizable compounds were subsequently copolymerized with electron beams analogously to Example 1, without the application of pressure and at room temperature. The paper, with the radiation-polymerized synthetic resin layer located on the outside, was placed on the outside of a stack of 50 papers one on top of the other. The papers were previously saturated with thermosetting phenol-formaldehyde resin and the resin partially cured. The packet was pressed in a press for 20 minutes at 150° C. and 80 bar. It had the following makeup:

decorative layer (radiation-polymerized synthetic resin with pigments) as an outer layer on a previously impregnated paper layer;

50 paper webs (saturated with phenol-formaldehyde resin) as the core layer;

decorative layer (radiation-polymerized synthetic resin with pigments) as an outer layer on a previously impregnated paper layer.

The panel thus obtained, which was 10 mm thick and decorative on both sides, had a scratch resistance greater than 3.0N (DI 53799, part 10). It was not vulnerable to hydrolysis and it exhibited no changes after 100 hours of boiling in water. Its surface was not attacked by concentrated mineral acid over a rection period of 6 hours (DIN 53230). The colorfastness of this panel was measured as grade 8 (DIN 54004). Its resistance to the effects of weathering was measured as in Example 1. After weathering, the panel exhibited no efflorescence of the fillers, no loss in sheen, and no discoloration.

EXAMPLE 3

The viscous, radiation-polymerizable liquid of Example 2 was applied in a layer approximately 100 $\mu$m rick to both sides of a piece of particle board (thickness 16 mm, gross density 700 kg/m$^3$) and largely homogeneously crosslinked as described in Example 1, with electron beams. The panel, with the radiation-polymerized synthetic resin layer located on both its surfaces, was pressed in a press for 90 seconds at 150° C. and 15 bar. The decorative panel obtained had a scratch resistance greater than 2.0N (DIN 53799, part 10). Its surface was not attacked by concentrated mineral acid over a reaction period of 6 hours. The colorfastness of this panel was assigned grade 8 (DIN 54004).

EXAMPLE 4

The radiation-polymerizable liquid contained:

69 parts by weight of polyester acrylate oligomer as the prepolymer;

23 parts by weight of trimethylol propane triacrylate as the diluting monomer; and 8 parts by weight of pigment (organic dye).

The various components of this mixture were processed, for instance in a ball mill, into a homogeneous viscous liquid (viscosity, 75 poise at 20° C.) and applied in this form in a layer approximately 80 $\mu$m thick to a thermosetting, previously hardened soda craft paper containing phenol-formaldehyde resin (resin application 70% with respect to the paper). Then the radiation-polymerizable compounds were homogeneously crosslinked analogously to Example 1, by electron beams, without the application of pressure, at room temperature. The absorbed radiation dose was 5 to 10 kGy. A further layer of transparent, that is, pigment-free, radiation-polymerizable liquid containing the same polymerizable compounds as the first layer, but to which 1% of a UV-absorber (such as Givsorb UV-2 ®, made by Givaudan S. A.) had also been added, was applied to the first layer with rollers. This second layer formed a closed film with a layer thickness of approximately 20 $\mu$m. It was polymerized with electron beams in an inert atmosphere (oxygen content less than 100 ppm) without the application of pressure, at room temperature. The absorbed radiation dose was 60 kGy. The soda craft paper, with the pigment-free radiation-polymerized synthetic resin layer on the outside, was placed on both surfaces of a previously pressed and previously hardened web-like fiber mat (thickness, 26 mm), which comprised randomly deposited wood fibers saturated with phenol-formaldehyde resin. The packet was pressed in a press for 20 minutes at 150° C. and 80 bar. It had the following makeup:

transparent layer (radiation-polymerized synthetic resin) as the outermost layer;

pigmented, radiation-polymerized synthetic resin, as a decorative layer over a previously impregnated paper layer;

wood fiber mat (with phenol-formaldehyde resin), as the core layer;

pigmented, radiation-polymerized synthetic resin, as a decorative layer over a previously impregnated paper layer;

transparent layer (radiation-polymerized synthetic resin) as the outermost layer.

The panel obtained was 13 mm thick and was decorative on both sides; it had the same characteristics as the panel described in Example 2.

EXAMPLE 5

A first radiation-polymerizable liquid contained:

65 parts by weight of aliphatic urethane acrylate oligomer, as the prepolymer;

28 parts by weight of hexanediol diacrylate, as the diluting monomer; and 7 parts by weight of pigment (organic dye).

The various components of this mixture were processed, for instance with a ball mill, into a homogeneous viscous liquid (viscosity, 75 poise at 20° C.) and applied in this form, using a scraper roller, in a layer approximately 80 μm thick to a soda craft paper containing a thermosetting, previously hardened phenol-formaldehyde resin (resin application 70%, in terms of the paper). Immediately thereafter and in the same operation, a second radiation-polymerizable liquid was applied to this coating layer with a scraper roller in a thickness of 20 μm. This layer, in contrast to the first, was transparent and pigment-free and was a mixture of:

70 parts by weight of aliphatic urethane acrylate oligomer as the prepolymer; and 30 parts by weight of hexanediol diacrylate as the diluting monomer.

The two synthetic resin layers (total thickness, 100 μm) were polymerized with electron beams in an inert atmosphere (oxygen content less than 100 ppm) without the application of pressure, at room temperature (radiation dose 60 kGy). One layer of soda craft paper, with the radiation-polymerized synthetic resin layers on the outside, was applied to each of the two surfaces of a core layer. The core layer comprised a stack of 50 papers one on top of the other, which had been previously saturated with thermosetting phenol-formaldehyde resin and partially cured. The packet had the following makeup:

transparent layer (radiation-polymerized synthetic resin) as an outermost transparent layer;

pigmented, radiation-polymerized synthetic resin, as a decorative layer over a previously impregnated paper layer;

50 paper webs (with phenol-formaldehyde resin), as the core layer;

pigmented, radiation-polymerized synthetic resin, as a decorative layer over a previously impregnated paper layer; and a transparent layer (radiation-polymerized synthetic resin), as an outermost transparent layer.

The packet was pressed in a press for 20 minutes at 150° C. and 80 bar.

The panel obtained, which was 10 mm thick and was decorative on both sides, had the same characteristics as the panel described in Example 2.

EXAMPLE 6

Seven webs, one on top of the other, of soda craft paper containing partially cured phenol-formaldehyde resin were delivered to a continuous-operation pressing apparatus. One of the two outer webs had on its outside the radiation-polymerized, pigmented, 80-μm-thick synthetic resin layer described in example 5 (without the transparent outer layer). The throughput speed of the webs was 0.5 m/min. The pressing was effected at 100° C. and 50 bar over a period of approximately 6 minutes.

The packet, as it passed through the press, had the following makeup:

decorative layer (radiation-polymerized synthetic resin with pigments), as an outermost layer over a previously impregnated paper web;

five paper webs (with phenol-formaldehyde resin), as the core layer.

The panel obtained was 1.3 mm thick and was decorative on one side. It had the same characteristics as the panel described in Example 2.

The panels obtained according to the Examples had a higher scratch resistance after the application of pressure and heat, compared with the radiation-polymerized layers which had a scratch resistance of only about 0.6 to 0.9N, as measured before the application of pressure and heat.

What is claimed is:

1. A decorative panel comprising an underlay, a decorative layer applied to said underlay, and a transparent outermost layer applied to said decorative layer, said outermost layer consisting essentially of the product of radiation-polymerizing a mixture consisting essentially of (i) a radiation-polymerizable, aliphatic urethane acrylate oligomer and (ii) a diacrylate or triacrylate monomer, wherein said outermost layer has a scratch resistance of at least 1.5 Newtons, as measured by DIN 53799, part 10, and displays no loss of sheen or discoloration when measured for weather-resistance in accordance with ASTM G 53-84.

2. A decorative panel as claimed in claim 1, wherein said panel is a product of a process comprising the steps of (a) providing an underlay; (b) applying to said underlay a decorative layer; (c) applying to said decorative layer a liquid coating consisting essentially of said radiation-polymerizable mixture; (d) polymerizing said mixture by means of radiation to form a radiation-polymerized layer on said decorative layer; and (e) thermopressing said underlay, said decorative layer and said radiation-polymerized layer under conditions of elevated temperature and pressure such that a scratch resistance of at least about 1.5 Newtons, as measured by DIN 53799, part 10, is imparted to said radiation-polymerized layer.

3. A decorative panel as claimed in claim 2, wherein said underlay is comprised of wood, plastic or metal, and wherein step (e) is performed, at a temperature ranging between about 80° C. and about 210° C. and at a pressure of between about 5 and about 100 bar, for about 1 to about 30 minutes.

4. A decorative panel as claimed in claim 3, wherein said process further comprises, prior to step (b), applying to said underlay a layer comprising an adhesive or adhesion promoting material.

5. A decorative panel as claimed in claim 1, wherein said underlay is comprised of a thermopressed-paper layer, a bonded fabric or a densified fiber mat.

6. A decorative panel as claimed in claim 5, further comprising a core layer upon which said underlay is provided, said core layer comprising a thermopressed stack of fiber-containing layers.

7. A decorative panel as claimed in claim 5, further comprising a core layer upon which said underlay is provided, said core layer comprising a thermopressed stack of soda craft paper sheets.

8. A decorative panel as claimed in claim 5, wherein said bonded fabric is comprised of at least one of wood and cellulose fibers.

9. A decorative panel as claimed in claim 1, wherein said decorative layer consists essentially of a decorative radiation-polymerized synthetic resin.

10. A decorative panel as claimed in claim 2, wherein step (e) is performed at a temperature of from about 120° C. to about 210° C., at a pressure of from about 10 to about 100 bar, and for a period of from about 1 to about 30 minutes.

11. A decorative panel as claimed in claim 1, wherein said monomer (ii) is a diacrylate ester of acrylic acid with an aliphatic divalent alcohol, an aliphatic ether alcohol, an oxyalkylated derivative of an aliphatic divalent alcohol or an aliphatic ether alcohol, or an aromatic dihydroxyl compound.

12. A decorative panel as claimed in claim 11, wherein said monomer (ii) is a 1,6-hexanediol diacrylate, tripropylene glycol diacrylate or 1,4-butanediol diacrylate.

13. A decorative panel as claimed in claim 1, wherein said monomer (ii) is trimethylol propane triacrylate or pentaerythritol triacrylate.

14. A decorative panel as claimed in claim 1, wherein said oligomer (i) is present in a proportion of from 60% to 90% by weight, based on the total weight of the copolymerizable components.

* * * * *

UNITED STATES PATENT AND TRADEMARK OFFICE
CERTIFICATE OF CORRECTION

PATENT NO. : 4,801,495

DATED : January 31, 1989

INVENTOR(S) : van der Hoeven

It is certified that error appears in the above-identified patent and that said Letters Patent is hereby corrected as shown below:

Title page:

Please correct the spelling of inventor's name:

[75] Inventor: Johannes C. W. van der Hoeven.

Signed and Sealed this

Third Day of October, 1989

*Attest:*

DONALD J. QUIGG

*Attesting Officer*  *Commissioner of Patents and Trademarks*